United States Patent [19]

Kuniyone et al.

[11] Patent Number: 5,535,891

[45] Date of Patent: Jul. 16, 1996

[54] METHOD OF PROCESSING SCRAPS AND EQUIPMENT THEREFOR

[75] Inventors: Hiroharu Kuniyone, Okagakimachi; Tsunoru Nagaki, Kitakyushu, both of Japan

[73] Assignee: Nippon Jiryoku Senko Co., Ltd., Kitakyushu, Japan

[21] Appl. No.: 311,460

[22] Filed: Sep. 26, 1994

Related U.S. Application Data

[63] Continuation-in-part of Ser. No. 108,504, Aug. 18, 1993, abandoned.

[51] Int. Cl.$^6$ ........................................................ B03B 7/00
[52] U.S. Cl. .............................. 209/12.1; 209/17; 209/39; 209/159; 209/212
[58] Field of Search ................................ 209/12.1, 17, 38, 209/39, 160, 158, 159, 172, 172.5, 173, 212, 667

[56] References Cited

U.S. PATENT DOCUMENTS

| | | | |
|---|---|---|---|
| 2,698,087 | 12/1954 | Call et al. | 209/158 |
| 4,036,441 | 7/1977 | Basten et al. | 209/39 X |
| 4,192,738 | 3/1980 | Colombo et al. | 209/39 x |
| 4,834,870 | 5/1989 | Osterberg et al. | 209/212 X |
| 5,373,948 | 12/1994 | Nagaki | 209/667 |

FOREIGN PATENT DOCUMENTS

| | | |
|---|---|---|
| 50-108765 | 8/1975 | Japan . |
| 54-18076 | 7/1979 | Japan . |
| 55-111544 | 2/1980 | Japan . |
| 56-33146 | 8/1981 | Japan . |
| 57-4374 | 1/1982 | Japan . |
| 59-1707 | 1/1984 | Japan . |
| 4-326955 | 11/1992 | Japan . |
| 1240450 | 6/1986 | U.S.S.R. ............................ 209/12.1 |

OTHER PUBLICATIONS

Ching–Hwa Lee, et al, Applied Technology, "Separating Aluminum from Shredded Automotive Scrap", pp. 40–42.

*Primary Examiner*—William E. Terrell
*Assistant Examiner*—Tuan Nguyen
*Attorney, Agent, or Firm*—Nikaido, Marmelstein, Murray & Oram

[57] ABSTRACT

A method and apparatus for processing scraps by separating and recovering various nonferrous metals from a mixture of scraps comprising nonferrous metals and nonmetals, wherein scraps which have been crushed and cleared of magnetic substance parted from long-size material and washed out of the adhering fine dust and oily substance, and separated into light and heavy materials based on the difference in the specific gravity thereof by use of a heavy liquid made up of water and magnetic powder body and by the effect of an upward flow of the heavy liquid which increases its own apparent specific gravity; the separated light material is further sorted into nonferrous metals and nonmetals based on the difference in the electric conductivity thereof by the application of a moving magnetic field thereto, being recovered as resources.

5 Claims, 6 Drawing Sheets

DIVISION INTO SEXTANT

11e

LENGTH OF SIEVE P=200×6

5,535,891

METHOD OF PROCESSING SCRAPS AND EQUIPMENT THEREFOR

This is a continuation-in-part application of U.S. patent application Ser. No. 08/108,504 filed Aug. 18, 1993, now abandoned.

BACKGROUND OF THE INVENTION

The present invention relates to a method of and an equipment for processing scraps or, to be more exact, it relates to a method of and an equipment for processing scraps to be used in recovering metals such as aluminum, zinc, copper, and stainless steel from the scraps of crushed cars, etc.

Conventionally, a car, etc. out of service are crushed into small pieces of 50 to 60 mm in size by a preshredder and a shredder, and then such small pieces are separated into light and heavy scraps by use of an air-blast separator. From the heavy scraps, scrap iron is extracted by use of a magnetic separator and recovered as a resource.

In the heavy scraps from which the scrap iron has been removed, there are nonferrous metals such as copper, aluminum, zinc, and stainless steel, and glass, rubber, etc. The nonferrous metals and the rubber, glass, etc. are separated by an air-blast separation or by utilizing the electrical properties thereof and, from the separated nonferrous metals, copper, aluminum, zinc, stainless steel, and other scraps are further separated by a manual selection.

However, there has been a problem that the manual selection of nonferrous metals such as copper, aluminum, zinc, stainless steel needs a troublesome work and the working efficiency is extremely bad.

SUMMARY OF THE INVENTION

To solve this problem, the inventor of this invention made an earnest study and investigation on a heavy-liquid separator wherein the material to be processed is charged into a separating vessel filled with heavy liquid mixed with magnetic powder body such as magnetite and then light material such as aluminum that floats and other heavy material that sinks are separated by the difference in the specific gravity thereof, having developed a method of and an equipment for processing scraps by use of that heavy-liquid separator.

The present invention has been made in view of the mentioned circumstances and, accordingly, it is an object of this invention to provide a method of and an equipment for processing scraps to recover useful metals from scraps with preferable efficiency.

The method of processing scraps according to the present invention with the object mentioned above is a method of processing scraps by separating and recovering various nonferrous metals from a mixture of scraps consisting of nonferrous metals and nonmetals, comprising a step of removing long-size material from aforesaid scraps which have been crushed and cleared of magnetic substance, a prewashing step of washing out with water the fine dust and oily substance adhering on the scraps from which the long-size material has been removed through aforesaid step, a heavy-liquid separating step of separating the scraps washed out through aforesaid step into light and heavy materials based on the difference in the specific gravity thereof by use of a heavy liquid made up of water and magnetic powder body and by giving an upward flow to said heavy liquid to increase its apparent specific gravity, a first postwashing step of washing out aforesaid heavy liquid adhering on aforesaid light material separated through aforesaid step, and a nonferrous light metals separating step of separating aforesaid light material into nonferrous metals and nonmetals based on the difference in the electric conductivity thereof by applying a moving magnetic field to said light material from which the heavy liquid adhering thereon has been removed through aforesaid step.

The equipment for processing scraps according to the present invention with the object mentioned above is an equipment for processing scraps by separating and recovering various nonferrous metals from a mixture of scraps consisting of nonferrous metals and nonmetals, comprising a long-size material separator for separating long-size material from the scraps which have been crushed and cleared of magnetic substance, a prewashing machine for washing out the fine dust and oily substance adhering on the scraps which have been separated into a specified length, a heavy-liquid separator which is equipped with a separating vessel filled with a heavy liquid made up of water and magnetic powder body and separates the water-washed scraps, etc. into light and heavy materials by means of aforesaid heavy liquid, a first postwashing machine for washing out the heavy liquid adhering on aforesaid separated light material, a second postwashing machine for washing out the heavy liquid adhering on aforesaid separated heavy material, a first nonferrous metal separator for separating aforesaid water-removed light material into nonferrous metals and nonmetals based on the difference in the electric conductivity thereof by applying a moving magnetic field to said light material, and a second nonferrous metal separator for separating aforesaid water-removed heavy material into plural kinds of nonferrous metals based on the difference in the specific gravity and / or the electric conductivity thereof by applying a moving magnetic field to said heavy material.

Here aforesaid scraps mean a mixture of nonferrous metals such as copper, zinc, aluminum, and stainless steel and nonmetals such as plastics and rubber taken from crushed cars, home electric appliances, etc. for example.

In the method of and the equipment for processing scraps comprising as described above and according to the present invention, the step of separating material by means of heavy liquid is smooth to carry out because magnetic material such as iron scrap has been removed through a crushing step and long-size material such as electric wire has also been removed from the resultant scrap.

Further, because the fine dust and oily substance adhering on the scraps from which long-size material has been removed are washed out with water, the heavy liquid used in the following steps is free from such fine dust and oily substance. Whereby the scraps after washed out are separated into light and heavy materials with good efficiency based on the difference in the specific gravity thereof by means of the heavy liquid.

Then the heavy liquid adhering on the light material is washed out, and said light material cleared of heavy liquid is applied with a moving magnetic field to be separated into nonferrous metals such as aluminum and nonmetals, for example, rubber and plastics based on the difference in the electric conductivity thereof, whereby useful metals such as aluminum are recovered from the scraps with good efficiency.

Moreover, because the heavy liquid is made up of water and magnetic powder body, and the apparent specific gravity of the heavy liquid is increased by an upward flow generated in the vessel, it is possible to use magnetite which is an example of a magnetic powder body having relatively small specific gravity and, further, said magnetic powder body is easy to recover from the heavy liquid by use of a magnetic separator.

In addition, to the method of processing scraps according to the present invention, it is possible to add a second postwashing step for washing out the heavy liquid adhering on the heavy material separated through aforesaid heavy-liquid separating step and the nonferrous heavy material separating step for separating aforesaid heavy material cleared of heavy liquid into plural kinds of nonferrous metals based on the difference in the specific gravity and / or the electric conductivity thereof by applying a moving magnetic field to said heavy material. Whereby useful metals such as copper, zinc, and lead included in the heavy material are separated and recovered with good efficiency because said heavy material cleared of heavy liquid is separated into plural kinds of nonferrous metals based on the difference in the specific gravity and / or the electric conductivity thereof by applying a moving magnetic field to said heavy material.

Further, in aforesaid equipment for processing scraps, it is possible to employ a single nonferrous metal separator which works both as aforesaid first and second nonferrous metal separators to separate aforesaid light and heavy materials together, whereby the space for the equipment is reduced and the equipment itself becomes simpler.

Moreover, in aforesaid equipment for processing scraps, it is possible to provide aforesaid separating vessel with a material charging section for charging aforesaid scraps and a material discharging section for discharging aforesaid light material at either one side thereof and a material discharging section for discharging aforesaid heavy material at the other side thereof, and to eject aforesaid heavy liquid from the intermediate and / or lower portion of said separating vessel by use of a pump to generate an upward flow at least in the upper half of said separating vessel, increasing the apparent specific gravity of said heavy liquid (a liquid mixture of water and magnetite powder, for example) and separating the metals having a larger specific gravity (aluminum, for example).

DETAILED DESCRIPTION OF PREFERRED EMBODIMENT OF THE PRESENT INVENTION

Then, referring to the attached drawings, the embodiments that embodied the present invention will be explained hereinbelow for the purpose of good understanding of this invention.

Figure 1:
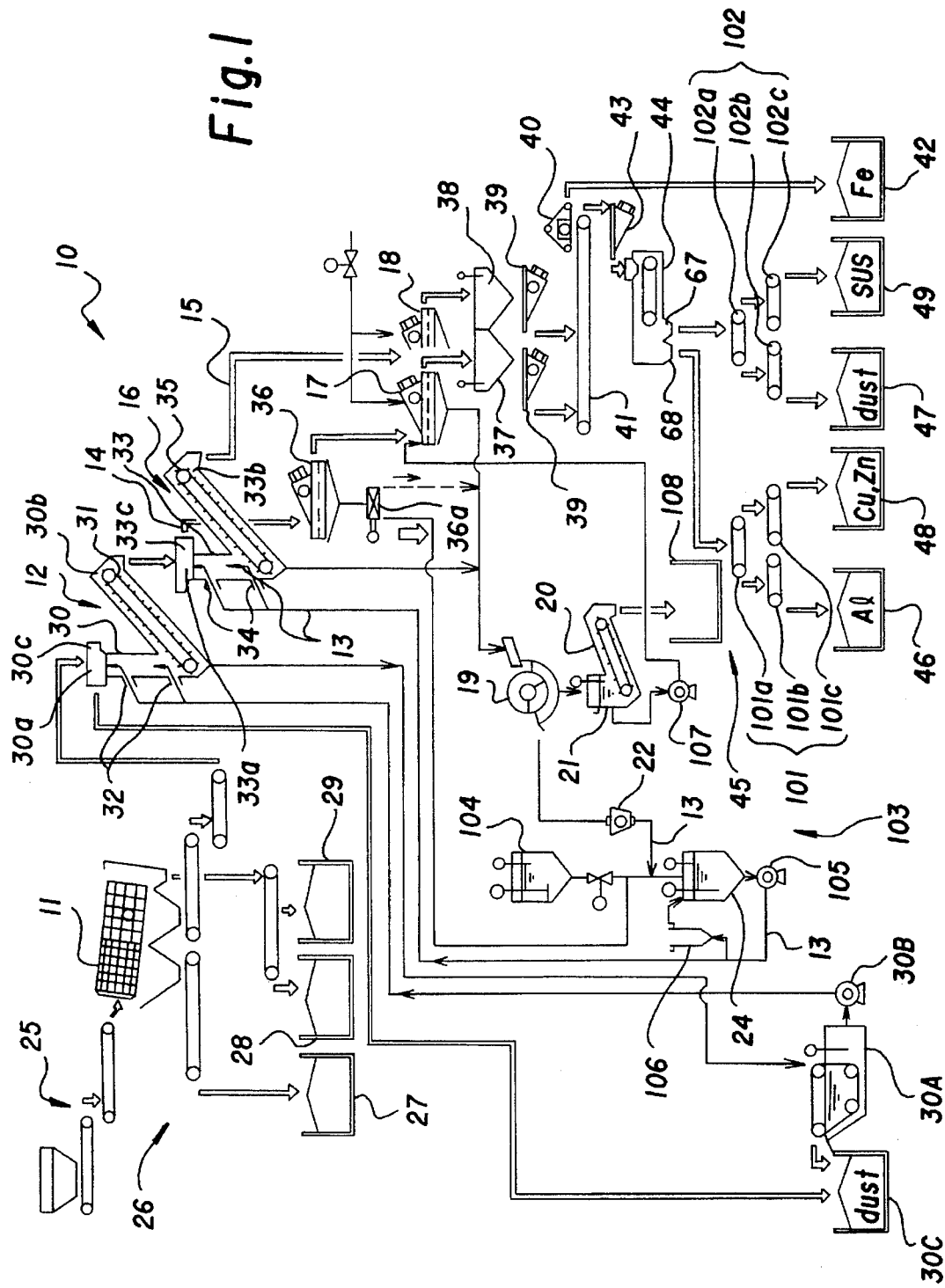
FIG. 1 is a general view of the equipment for processing scraps relating to one embodiment of the present invention.

As shown in FIG. 1, the equipment 10 for processing scraps according to one embodiment of the present invention comprises a long-size material separator 11 for separating small material, large material, and long-size material such as electric wire and wire rope from scraps, a prewashing machine 12 for washing out the fine dust and oily substance adhering on the scraps separated into a specified size, a heavy-liquid separator 16 for separating the washed scraps into light material 14 and heavy material 15 by means of a heavy liquid 13, water screens 17 and 18 which are examples respectively of a first and a second postwashing machines for washing out the heavy liquid 13 adhering on the separated light material 14 and heavy material 15, a wet-type magnetic separator 19 for absorbing and separating the magnetic powder body in the heavy liquid 13 discharged through the water screens 17 and 18, a water tank 21 equipped with a discharging conveyer 20 for discharging the impurities included in the water discharged from the magnetic separator 19 and settled on the bottom of the tank 21, a demagnetizer 22 for demagnetizing the magnetic powder body absorbed by the magnetic separator 19, and a heavy liquid tank 24 for reserving the heavy liquid 13 including the magnetic powder body demagnetized by the demagnetizer 22 and for supplying said heavy liquid 13 to the heavy-liquid separator 16.

The scraps to be supplied to said equipment 10 for processing scraps are those of 50 to 60 mm or less pieces of cars out of use crushed by a preshredder or a shredder, from which lighter nonmetals are removed by use of a well-known air-blast separator, and magnetic substance such as iron pieces are also removed by means of a large-type magnetic separator. However, aforesaid scraps include relatively long material such as electric wire.

On the upper stream side of aforesaid long-material separator 11 which is a rotating cylindrical screen, there is disposed a take-in device 25 made up of a plural number of conveyers. At the downstream side of this long-material separator 11, there is provided a separator 26 for separating small, large, and long materials, which are separated and gathered respectively into a small-material recovering box 27, a large-material recovering box 28, and a long-material recovering box 29.

Then, referring to FIGS. 2 through 5, the details of the long-size material separator 11 will be explained.

Figures 2, 3:
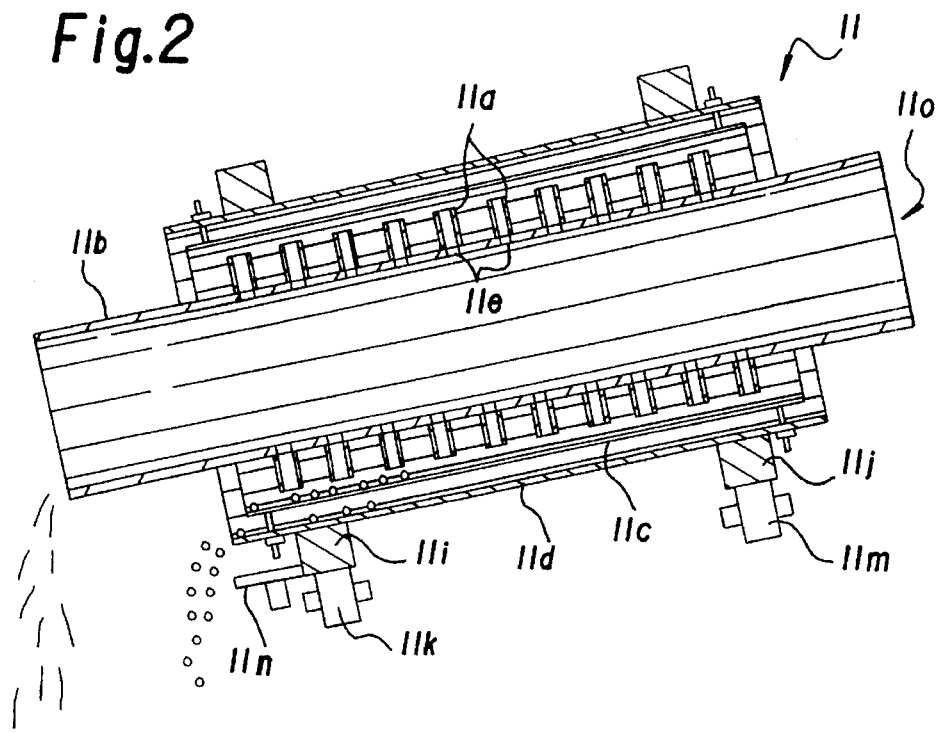
FIG. 2 is a longitudinal sectional view of the long-size material separator.
FIG. 3 is a transverse sectional view of the long-size material separator.

As shown in FIG. 2 and FIG. 3, the long-material separator 11 is totally made up of a corrosion-resistant steel or stainless steel and consists of an inner pipe 11b around which a plurality of short pipes 11a are installed, arc-shaped receiving plates 11c installed with spaces around the outside of the inner plate 11b, an outer pipe 11d installed around the outside of the receiving plates 11c, and a driving source which is not shown for rotating those components. In addition, the long-size material separator 11 is under application for U.S. patent as the U.S. patent application Ser. No. 08/077,447 and it has the same structure as of the long-material separator disclosed in Japanese Patent Publication No. 6-91231 published on Apr. 15, 1994.

Figure 4:
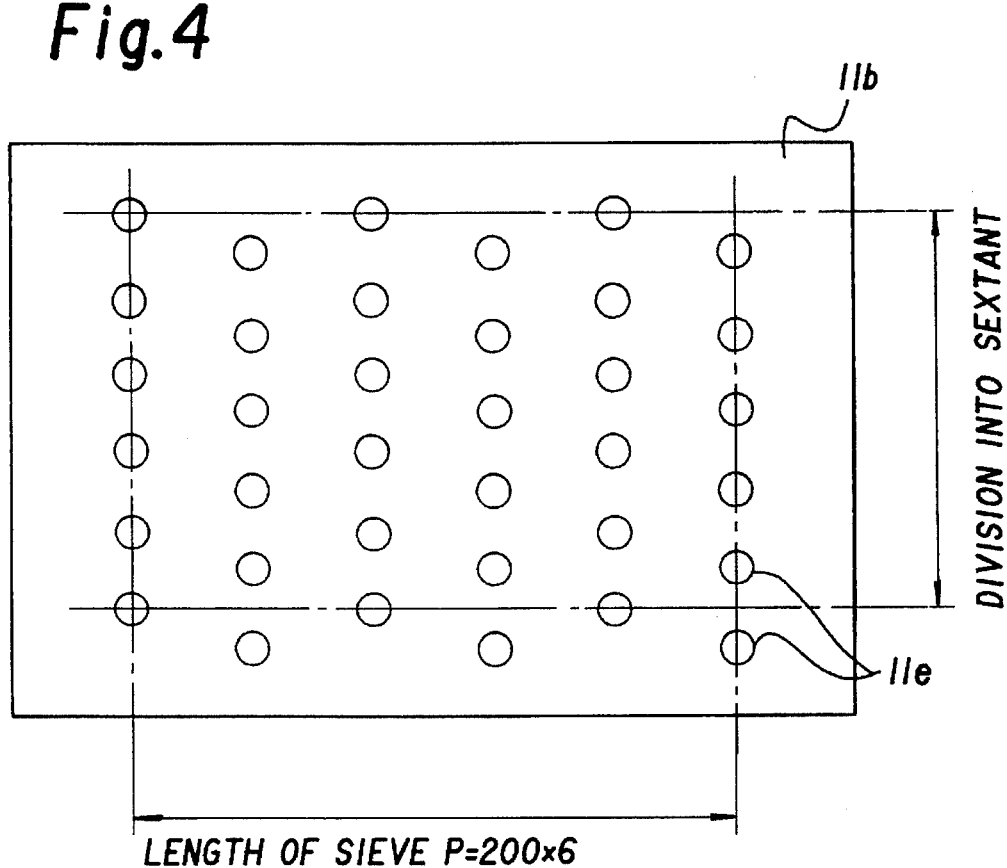
FIG. 4 is a partially developed view of the long-size material separator.
Figure 5:
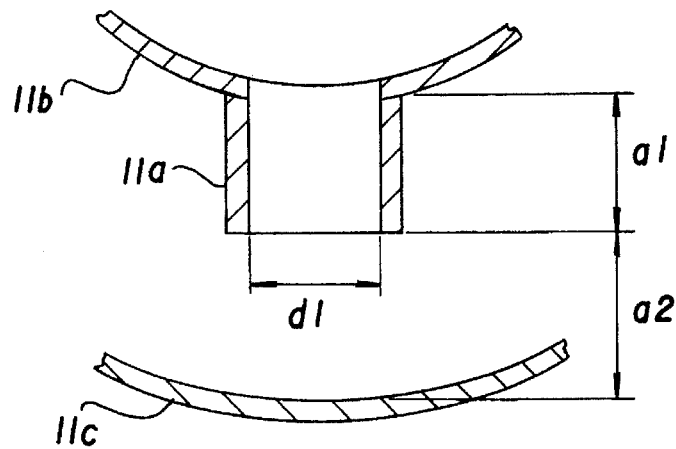
FIG. 5 is an enlarged sectional view showing the major portion of the long-size material separator.

The size of the short pipes 11a installed around the inner pipe 11b varies depending on the kind of the scraps to be separated. For example, as shown in FIG. 5, their inside diameter ($d_1$) is approximately 30 to 50 mm and their length ($a_1$) is approximately 20 to 50 mm if said scraps have been crushed by shredder into pieces of approximately 50 mm or less in size through preceding processes. Through the inner pipe 11b around which said short pipes 11a are installed, a plurality of separation holes 11e are formed with staggered pitches as shown in FIG. 4. And the inner pipe 11b is supported by supporting members 11f at both top and tail ends and concentric with the outer pipe 11d.

At the outside of the inner pipe 11b, receiving plates 11c are provided each of which has an arc-like cross section and, to the outside of each of said receiving plates 11c, bolts 11g are installed at both ends so that the receiving plates 11c may be attached to the outer pipe 11d with nuts 11h and move back and forth freely by adjusting the nuts 11h.

The distance ($a_2$) between these receiving plates 11c and each discharging port of the short pipes 11a is approximately 20 to 50 mm but varies depending on the kind of scraps to be separated as same as the length and the inside diameter of the short pipes 11a.

Around the both ends of the outer pipe 11d, tires 11i and 11j are provided, and, to the tires 11i and 11j, driving wheels 11k and 11m which are connected to aforesaid driving source and a longitudinal guide wheel 11n are contacted respectively, and, by use of aforesaid driving source (that is, a motor), said tires 11i and 11j are rotated so that the whole body of the separator may rotate at 10 to 60 rpm. Meanwhile the outer pipe 11d is given a slope of 5 to 30 degrees so that the scraps charged from the upper stream of the pipe may go smoothly down to the downstream.

Therefore, to use the long-size material separator 11, the scraps are charged gradually from a charging port 11o. Then fine scraps and those which are not long in size drop into the short pipes 11a through the separation holes 11e which come in sequence under the rotating inner pipe 11b and flow down to the downstream through a spacing between the edge of the short pipes 11a and the receiving plates 11c. Meanwhile the long-size material which is longer than the spacing between the edge of the short pipes 11a and the receiving plates 11c is caught by the short pipes 11a and becomes impossible to flow down. Then, by the rotation of the inner pipe 11b, such long-size material is lifted up as it is and, when the short pipes 11a come to the top position, drops into the inner pipe and is caught again by the short pipes 11a at the downstream. Repeating this process, the long-size material is discharged from the downstream end of the receiving plates 11c or from the downstream end of the outer pipe 11d. Whereby long-size material such as electric wire is separated from non-long-size material.

Then, referring to FIG. 1 and FIG. 6, the details of the prewashing machine 12 will be explained.

Figure 6:
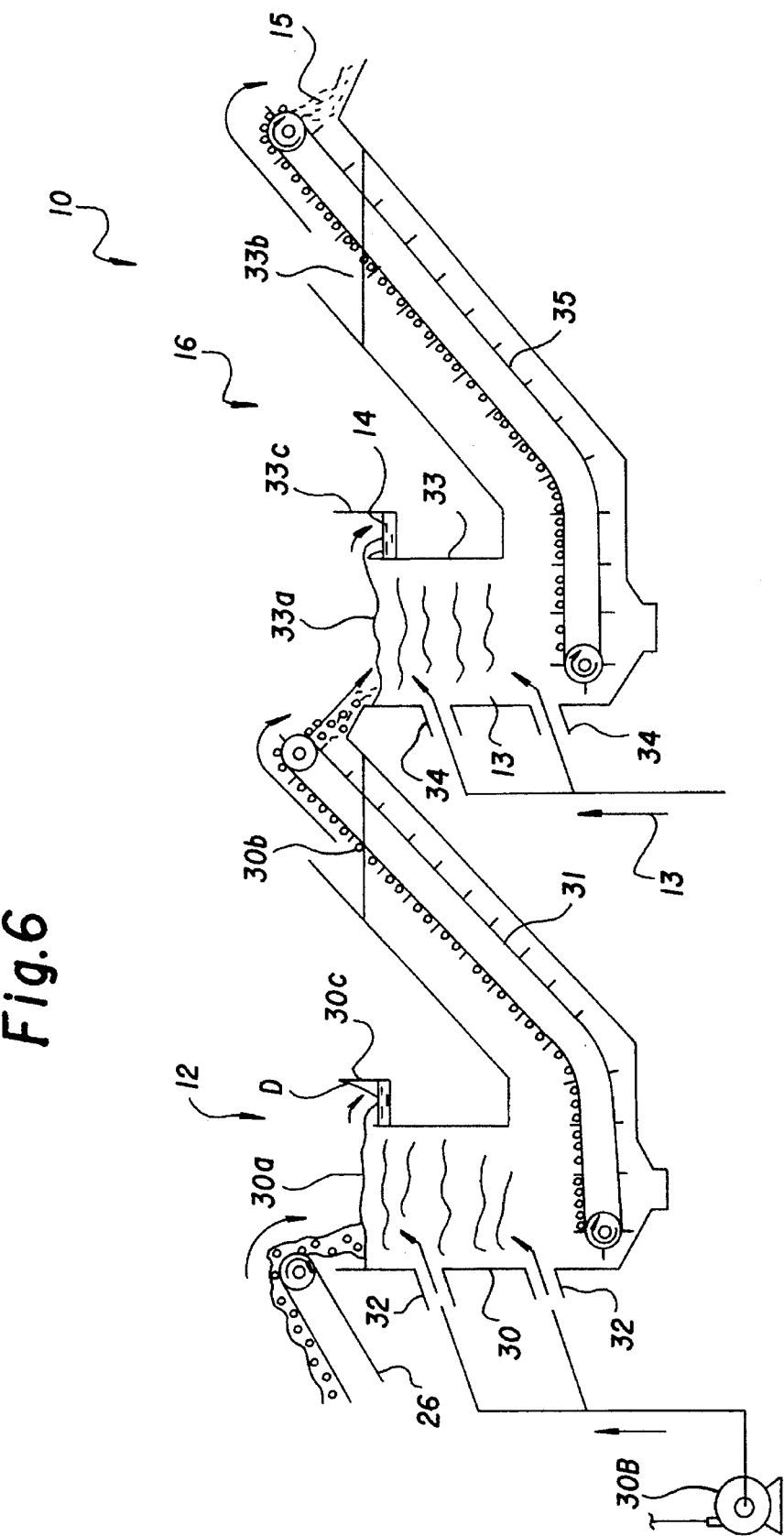
FIG. 6 is a sectional view of the washing machine and the heavy-liquid separator.

As shown in FIG. 1 and FIG. 6, the prewashing machine 12 is provided with a large and nearly square cylindrical water vessel 30 and, at the material charging section 30a of the water vessel 30, there is disposed a trough-type dust discharging section 30c for receiving waste D such as dust and oily substance floating up by water washing. In the water vessel 30, from the bottom of this vessel 30 to the material charging section 30b, there is equipped a discharging conveyer 31 having a plurality of scraping plates provided with specified pitches.

Further, on the top and bottom peripheral surface of the material-charging side of the water vessel 30, there is provided a top and bottom pair of water ejecting section 32 for ejecting the water supplied from circulation water tank 30A and pressurized by a pump 30B. In addition, the water is ejected up obliquely from the water ejecting section 32. As a result of water washing, the fine dust and oily substance adhering on the scraps spill over a scrap discharging section 30c provided at the material charging section 30a and recovered into a dust box 30C.

The heavy-liquid separator 16 is nearly the same in shape as the prewashing machine 12 and consists of a separating vessel 33 which is the main body of this separator, a top and bottom pair of ejecting section 34 formed obliquely in upward direction on the peripheral surface of the material charging section of the separating vessel 33 for ejecting heavy liquid 13, a discharging conveyer 35 consisting of a chain conveyer for discharging heavy material 15 such as scrap (glass, etc. ), copper, zinc, stainless steel, and iron settled on the bottom of the separating vessel 33, wherein the heavy liquid ejected from each upward oblique ejecting section 34 gives an upward flow to the whole heavy liquid in the vessel and increases the apparent specific gravity of said heavy liquid (from $\gamma=2.5$ to $\gamma=2.7$ to 2.8), thus separating aluminum mixing therein.

In addition, by providing an air blowing section for supplying air to the separating vessel 33 beside the ejecting section 34 so as to mix air to the heavy liquid 13, it may be possible to boost the effect of stirring the magnetite and water in the vessel 33 and also strengthen the bottom-to-top flow of said heavy liquid 13.

Here, Table 1 shows the particle distribution, true specific gravity, and the content of magnetic substance of the heavy liquid 13 used in this embodiment, and Table 2 shows an example of chemical analysis. The specific gravity of said heavy liquid 13 was regulated to approximately 2.2, and the flow rate of an upward flow was 90 l / min. The size of the nonferrous metals to be separated was 10 to 40 mm.

TABLE 1

| Characteristics | μmm | % |
| --- | --- | --- |
| Particle distribution | +125 | 2.84 |
|  | 125 to 62 | 12.55 |
|  | 62 to 31 | 28.06 |
|  | 31 to 16 | 20.95 |
|  | 16 to 7.8 | 18.06 |
|  | 7.8 to 3.9 | 9.93 |
|  | −3.9 | 7.61 |
| True specific gravity |  | 4.7 |
| Content of magnetic substance |  | 94.1 |

TABLE 2

| T.Fe | FeO | $SiO_2$ | $Al_2O_3$ | S | P | $TiO_2$ | Mn | Cu | Zn |
| --- | --- | --- | --- | --- | --- | --- | --- | --- | --- |
| 60.63 | 28.80 | 3.01 | 2.40 | 0.004 | 0.173 | 3.94 | 0.39 | 0.05 | 0.50 |

(T.Fe shows total amount of iron.)

In case of a heavy liquid separation in which the floating bodies are glass and stone having specific gravities of 2.7 and 2.5 to 3 respectively, the pseudo specific gravity of a heavy liquid must be approximately 3 if no flow is given to it as in conventional practices. In this embodiment, however, the pseudo specific gravity of a heavy liquid is smaller because the heavy liquid is given an upward flow. Table 3 below shows the charged material, separated floating body (material that floats on the heavy liquid), and sinking body (material that sinks in the heavy liquid).

TABLE 3

| Item | Wt % | Distribution (%) | | | | | |
|---|---|---|---|---|---|---|---|
| | | Al | Cu | Zn | Stone | Glass | SS |
| Material | 100 | 45.9 | 15.4 | 10.5 | 12.6 | 6.2 | 9.4 |
| Floating body | 72.8 | 99.6 | 14.4 | 0 | 96.2 | 99.3 | 15.4 |
| Sinking body | 27.2 | 0.4 | 85.6 | 100 | 3.8 | 0.7 | 84.6 |

(SS : Stainless steel)

As shown in FIG. 1 and FIG. 6, light material 14 such as aluminum flows out of the light material discharging section 33c provided at the material charging section 33a of the separating vessel 33, and heavy material 15 is discharged from the heavy material discharging section 33b of the separating vessel 33 by means of a discharging conveyer 35. Since the light material 14 is discharged together with the heavy liquid 13 from the heavy-liquid separator 16, it is retained by a heavy liquid separating screen 36 before being sent to the water screen 17.

In addition, the waste water discharged from the heavy liquid separating screen 36 is once stocked in a tank 36a and separated into heavy liquid 13 and water including impurities. Then the heavy liquid 13 is returned to a heavy liquid tank 24 and the water is sent to aforesaid magnetic separator 19 together with the waste water including impurities discharged from the water screens 17 and 18.

Under the water screens 17 and 18, there are provided a light material hopper 37 and a heavy material hopper 38 and, under the discharging section of both hoppers 37 and 38, there is provided a pair of feeder 39. Under the feeder 39, there is provided a separating conveyer 41 equipped with a magnetic separator 40 hanging from the upper portion at the downstream side thereof, by means of which the iron included in the light material 14 and the heavy material 15 is attracted and then charged into an iron recovering box 42.

At the downstream side of the separating conveyer 41, there is provided a feeder 43 and, under the feeder 43, there is provided a nonferrous material separator 44 which works as both a first and a second nonferrous material separators to which a principle of linear motor (that is, a moving magnetic field) is applied. Then, referring to FIG. 7 through FIG. 9, the details will be explained on the nonferrous material separator 44.

Figure 7:
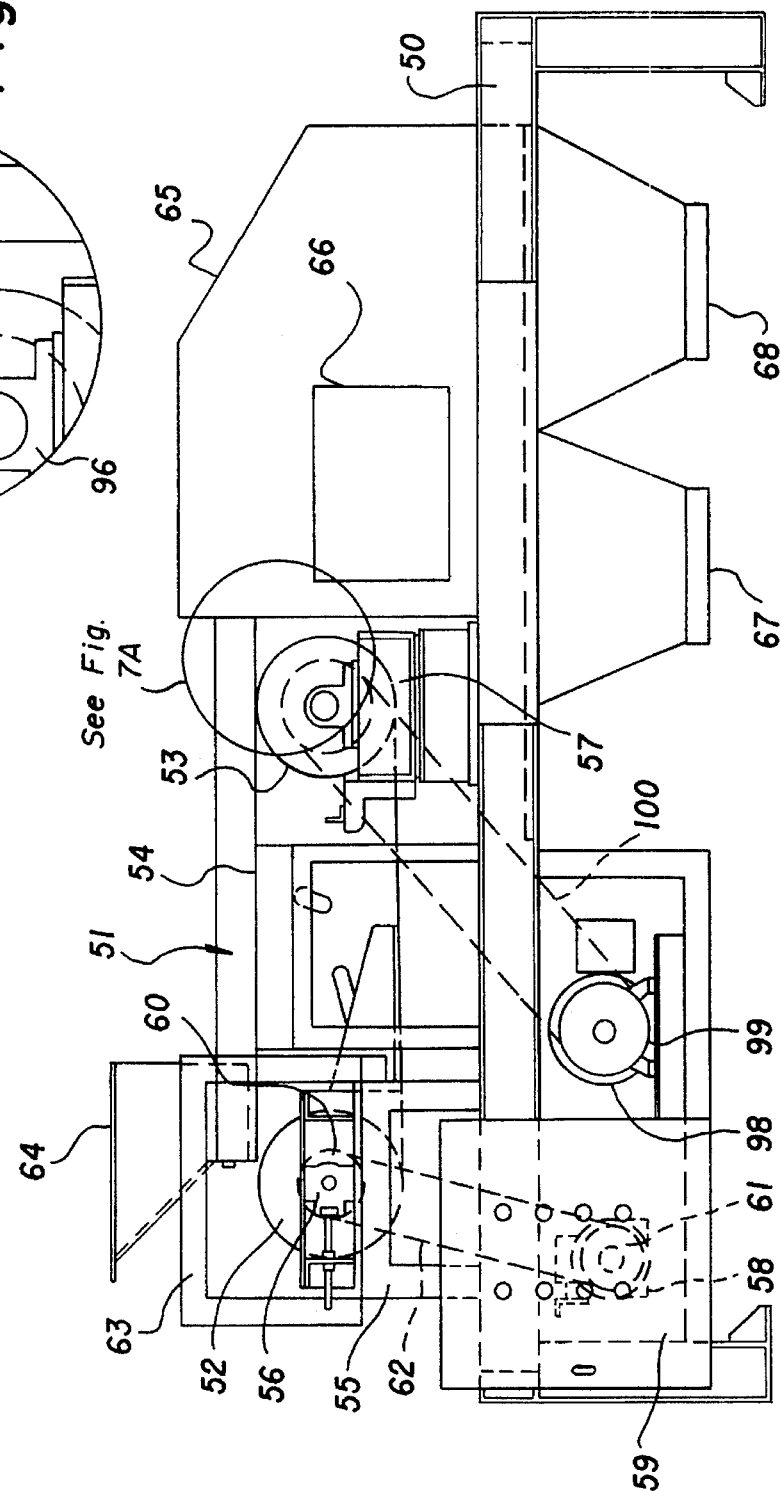
FIG. 7 is a front view of the nonferrous metal separator.

As shown in FIG. 7, the nonferrous material separator 44 is mounted on one side of a stand 50 which is a base of the separator and provided with a material transferring conveyer 51 for transferring the light material 14 and the heavy material 15 from which the heavy liquid is removed. The material transferring conveyer 51 has such a construction in that a material transferring belt 54 is stretched from a drive-side belt pulley 52 and a driven-side belt pulley 53. The drive-side belt pulley 52 is mounted via a belt tension adjusting mechanism 56 which is installed on a base 55, and the driven-side belt pulley 53 is mounted via a magnetic rotor base 57.

A stepless speed reducer 58, which is attached to a driving source of the material transferring conveyer 51, is disposed in a control box 59 installed on the lower portion of one side of the base 50, and the torque of the driving source is transmitted to the belt pulley 52 via a torque transmitting mechanism having a pair of pulleys 60 and 61 and a belt 62.

On the base 55, a box stand 63 is disposed and, on this box stand 63, there is provided a material charging hopper 64 for charging the light material 14 and the heavy material 15 to the upper stream side of the material transferring belt 54.

On the outside of the driven-side belt pulley 53, there is disposed a magnetic separation chamber 65, which is mounted on the upper portion of the other side of the stand 50. On the side face of the magnetic separation chamber 65, there is provided an observation window 66 and, under the stand 50, at the portion on which the magnetic separation chamber 65 is installed, a first discharging section 67 is attached near the belt pulley 53 and, a little off the belt pulley 53, a second discharging section 68 is attached. Then, referring to FIG. 8 and FIG. 9, the details will be explained on the magnetic rotor 69 which is provided in the driven-side belt pulley 53.

Figure 8:
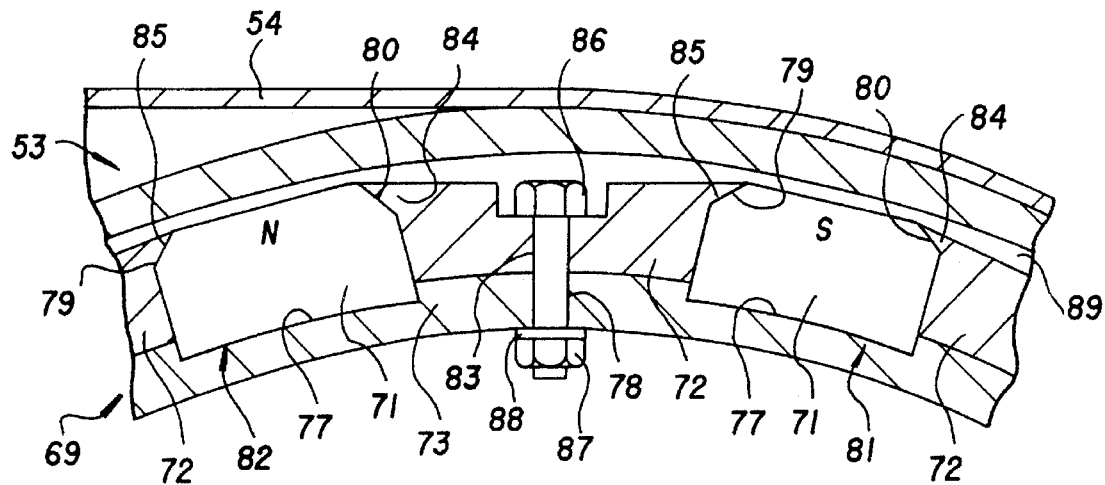
FIG. 8 is an enlarged sectional view showing the major portion of the magnetic rotor of the nonferrous metal separator.
Figure 9:
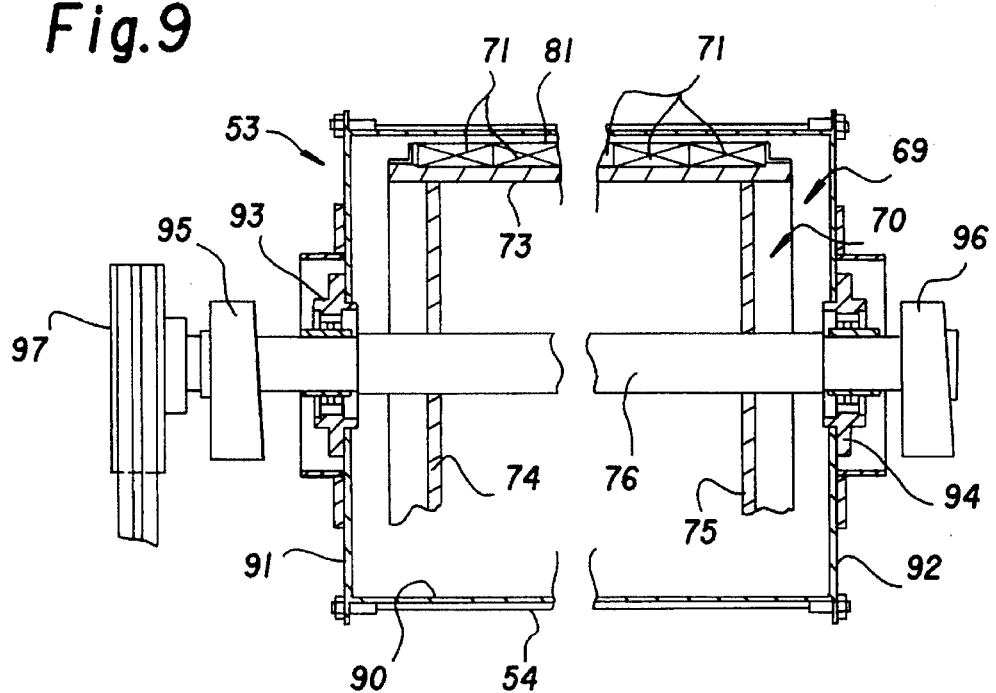
FIG. 9 is a sectional view of the magnetic rotor of the nonferrous metal separator.

As shown in FIG. 8 and FIG. 9, the magnetic rotor 69 consists of a magnetic rotor body 70, a magnet 71, and a fixing metal 72 for fixing the magnet 71 to the magnetic rotor body 70, and the magnet 71 generates a rotating magnetic field by the rotation of the magnetic rotor 69.

The magnetic rotor body 70 consists of a magnet-setting cylinder 73, doughnut-shaped side plates 74 and 75 which are fixed respectively on both inner sides of the cylinder 73, and a rotating shaft 76 which is placed at the center of said side plates 74 and 75. On the surface of the magnet-setting cylinder 73, slot-shaped magnet-setting holes 77 are formed along the axis of the magnetic rotor 69, wherein said magnet-setting holes 77 are placed at 24 positions and spaced each other in the rotating direction of the magnetic rotor 69, and, in the middle of each pair of abutting magnet-setting holes 77, there is provided a bolt hole 78.

For the magnet 71 to generate a rotating magnetic field, a ferrite magnet is used and, at both sides of the upper portion of the magnet 71, notches 79 and 80 are formed, and, in every second row of magnet-setting holes 77, a plurality of magnet 71 are disposed so that the top of each magnet may be a homopole, forming a row of S-pole magnets 81. In the magnet-setting holes 77 respectively abutting aforesaid every second row of magnet-setting holes 77, that is, abutting the row of S-pole magnets 81, a row of N-pole magnets 82 is disposed so that each row of magnets may be a heteropole alternately.

The fixing metal 72 is made of aluminum alloy material and, in the center thereof, a bolt hole 83 is formed and, at both sides of its top end, projecting portions 84 and 85 are formed, holding the notches 79 and 80 of the abutting magnets 71 at the same time to fix each magnet 71 to the magnet-setting cylinder 73 via bolt 86 and nut 87. In addition, the component indicated with a numeric number 88 is a washer.

Aforesaid belt pulley 53 is disposed so that it may cover the magnetic rotor 69 from outside, leaving a spacing 89. As shown in FIG. 9, the belt pulley 53 consists of an outer cylinder 90 formed into a cylindrical body made of an insulation FRP and doughnut-shaped side plates 91 and 92 each of whose periphery is fixed to each end of the outer cylinder 90. And the belt pulley 53 is connected to a rotating shaft 76 via bearings 93 and 94 mounted respectively in the center holes of the side plates 91 and 92.

The both ends of the rotating shafts 76 are connected respectively to bearings 95 and 96 installed on a magnetic rotor base 57 on the stand 50. On either one side-end of the rotating shaft 76, a belt pulley 97 is fixed and, as shown in FIG. 7, the belt pulley 97 is connected to a motor belt pulley 99 of a motor 98 installed on the stand 50 via a belt 100, whereby the magnetic rotor 69 is rotated at a high speed by the rotation of the motor 98. At this time, the projecting portions 84 and 85 of the fixing metal 72 fixed on the magnetic rotor body 70 secure each magnet 71 to the magnetic rotor body 70 by holding the notches 79 and 80 formed at both sides on top of each magnet 71, preventing the magnet 71 from coming outside off by the high-speed rotation of the magnetic rotor 69.

Then the explanation will be made on the separation of nonferrous metals by means of the nonferrous metal separator 44. As shown in FIG. 7, when the light material 14 and the heavy material 15 are transferred above the driven-side belt pulley 53 by the material transferring belt 54, a rotating magnetic field generated by the high-speed rotation of the magnetic rotor 69 passes at a high speed across nonferrous metals as a moving magnetic field.

As shown in FIG. 8, because the magnet 71 is provided with notches 79 and 80 at both side ends thereof, the distance between the ends of abutting magnets 71 increases. Then the flux density between those magnets 71 becomes smaller than that between the magnets 71 not provided with the notches 79 and 80, and the magnetic flux passes between the row of N-pole magnets 82 and the row of S-pole magnets 81, describing a parabola having a height. And many of the magnetic fluxes describing a parabola pass at a high speed across the nonferrous metals on the material-transferring belt 54.

As a result, an electromagnetic induction is induced in the light material 14 and the heavy material 15 across which many magnetic fluxes passed, and an eddy current and a thrust force are generated to make each material jump. Among nonferrous metals, due to the difference in specific gravity and electric conductivity, for example, copper and zinc jump relatively long and stainless steel does not jump very long. This principle is also utilized to separate the heavy material 15.

When the light material 14 is separated, the nonmetal scrap which does not influenced by a magnetic field because of its extremely large electric resistance drops into a first discharging section 67 near the driven-side belt pulley 53, and aluminum which is light and has a small electric resistance drops into a second discharging section 68 a little off the belt pulley 53. When the heavy material 15 is separated, stainless steel which does not jump very long because of its large specific gravity and large electric resistance drops into the first discharging section 67, and copper and zinc which jump long because of their small electric resistance in spite of large specific gravity drop into the second discharging section 68.

Here, returning to FIG. 1, at the downstream of the nonferrous metal separator 44, there is provided a sorter 45 made up of plural conveyers. More exactly, the sorter 45 consists of a long-jumped material transferring section 101 and a short-jumped material transferring section 102 disposed in the downstream of the second discharging section 68 and under the first discharging section 67 respectively. Both long- and short-jumped material transferring sections 101 and 102 consist respectively of upper belt conveyers 101a and 102a, left-hand lower belt conveyers 101b and 102b, and right-hand lower belt conveyers 101c and 102c, disposed upper and lower positions triangularly.

In case of separating the nonferrous metals included in the light material 14, the nonmetal scrap discharged from the first discharging section 67 is recovered into a nonmetal scrap recovering box 47 via the upper belt conveyer 102a and the left-hand lower belt conveyer 102b of the short-jumped material transferring section 102, and aluminum discharged from the second discharging section 68 is recovered into an aluminum recovering box 46 via the upper belt conveyer 101a and the left-hand lower belt conveyer 101b of the long-jumped material transferring section 101.

In case of separating the nonferrous metals included in the heavy material 15, stainless steel is recovered into a stainless steel recovering box 49 via the upper belt conveyer 102a and the right-hand lower belt conveyer 102c, and copper and zinc are recovered into a copper and zinc recovering box 48 via the upper belt conveyer 101a and the right-hand lower belt conveyer 101c.

In addition, the equipment 10 for processing scraps is provided with a heavy liquid circulation line 103. The heavy liquid circulation line 103 consists of aforesaid magnetic separator 19, a demagnetizer 22, a heavy liquid tank 24, heavier liquid tank 104 for supplying a heavy liquid whose specific gravity is larger than that of the heavy liquid 13 to the heavy liquid tank 24, a heavy liquid pump 105 for supplying the heavy liquid in the heavy liquid tank 24 into the separating vessel 33 of the heavy-liquid separator 16, and densitometer 106 for measuring the concentration of the heavy liquid 13. In FIG. 1, the numeric numbers 107 and 108 represent a water supply pump and a scrap box respectively.

Then the explanations will be made on the operation of the equipment 10 for processing scraps according to one embodiment of the present invention. As shown in FIG. 1, the scrap having been crushed and from which light scraps and iron scrap have been removed are charged into the long-size material separator 11 via the take-in device 25. Then, from the scraps, small, large, and long-size materials are removed and recovered into a small-material recovering box 27, a large-material recovering box 28, and a long-material recovering box 29 respectively.

Then only the scraps of a specified size are charged into the prewashing machine 12 and, in a water vessel 30, the scraps sinking in the vessel 30 is subjected to a water flow ejected from a water ejecting section 32 disposed at the lower portion of the water vessel 30, whereby the dust and oily substance which are light and adhering on the scraps overflow from a dust discharging section 30c of the water vessel 30 into a dust box 30C. The waste water discharged from the bottom of the water vessel 30 flows into a circulation tank 30A, where the reusable water is circulated to the prewashing machine 12 by a pump 30B and the impurities remaining in the circulation tank 30A is discharged into the dust box 30C by a conveyer disposed in the circulation tank 30A.

The scraps settled on the bottom of the water vessel 30 are fed to the heavy-liquid separator 16 through a material discharging section 30b by a discharging conveyer 31 and, by the effect of heavy liquid 13 in the separating vessel 33, separated into light material 14 and heavy material 15. The light material 14 is fed to the water screen 17 through a light-material discharging section 33c and via a heavy-liquid separating screen 36, and the heavy material 15 is fed to the water screen 18 through a heavy-material discharging section 33b by a discharging conveyer 35.

The light and heavy materials separated by the water screens 17 and 18 respectively are once stored in a light material hopper 37 and a heavy material hopper 38 respectively. Then, with a time lag, they are individually thrown onto a separating conveyer 41 by a feeder 39, fed to a nonferrous metal separator 44 via a feeder 43, and classified into various kinds of metals.

In case the light material 14 is separated, it is fed to the nonferrous metal separator 44 via the light material hopper 37, one of the two feeders 39, the separating conveyer 41, and the feeder 43, where the nonmetal scrap discharged from the first discharging section 67 is recovered into the nonmetal scrap recovering box 47 via the belt conveyers 102a and 102b, and aluminum discharged from the second discharging section 68 is recovered into the aluminum recovering box 46 via the belt conveyers 101a and 101b.

In case the heavy material 15 is separated, it is fed to the nonferrous metal separator 44 via the heavy material hopper 38, the other of the two feeders 39, the separating conveyer 41, and the feeder 43, where stainless steel discharged from the first discharging section 67 is recovered into the stainless steel recovering box 49 via the belt conveyers 102a and 102c, and copper and zinc discharged from the second discharging section 68 are recovered into the copper and zinc-recovering box 48 via the belt conveyers 101a and 101c.

In addition, an extremely small amount of iron included in the dust is attracted by the magnetic separator 40 hung from the overhead portion at the downstream of the separating conveyer 41 and recovered into an iron recovering box 42.

Then, the waste water including impurities such as copper wires discharged from the water screens 17 and 18 is fed to the magnetic separator 19 together with the heavy liquid 13 taken from the bottom of the heavy-liquid separator 16 and the waste water (shown with a dotted line in FIG. 1) of the dilution side discharged from the heavy-liquid separating screen 36 via a tank 36a. In the magnetic separator 19, only the magnetic powder body included in the waste water is attracted and separated, and then demagnetized by the demagnetizer 22 and returned to a heavy liquid tank 24. To this heavy liquid tank 24, the waste water (shown with a thick line in FIG. 1) of the heavy liquid side discharged from the tank 36a is directly fed.

The specific gravity of the heavy liquid 13 in the heavy liquid tank 24 is adjusted to 2.5 by the observation with the densitometer 106 and by the addition of high-density heavy liquid from the heavier liquid tank 104. Then the heavy liquid 13 is pumped by a pump 105 to the heavy liquid separator 16 for recirculation.

Meanwhile the waste water cleared of magnetic powder body and discharged from the magnetic separator 19 is once stored in the water tank 21, where the impurities such as copper wires settle on the bottom. Then they are scraped up by the discharging conveyer 20 and recovered into a scrap box 108 through the discharging section of the water tank 21. Here, only the supernatant liquid of the water tank 21 is pumped by a pump 107 to the water screens 17 and 18 for reuse.

As described above, by the introduction of heavy-liquid separation in separating nonferrous metals such as copper, aluminum, zinc, stainless steel, and scrap, the separation work becomes easy and the work efficiency is more improved than that in the conventional manual selection.

Further, since the waste water including impurities discharged from the water screens 17 and 18 is cleared of its magnetic powder body by the magnetic separator 19 before being pumped up by the pump 105, and only the separated magnetic powder body is reused by circulation as the raw material for the heavy liquid 13 to be supplied to the heavy liquid separator 16, there occurs no clog in the heavy liquid circulation line such as said pump 105 even if copper wires are included in the waste water in question. Moreover, the recirculation of heavy liquid 13 can reduce the running cost of the heavy-liquid separation process.

Furthermore, because the waste water from the magnetic separator 19 is once stored in the water tank 21 and, there, impurities such as copper wires in the waste water settle on the bottom of the water tank 21 and discharged by the discharging conveyer 20, the water in the water tank 21 can be recirculated for the water to be used at the water screens 17 and 18 without causing a clog due to impurities in the water circulation line.

Further, because the nonferrous metal separator 44 works both as the first nonferrous metal separator to separate and recover nonferrous metals from the light material 14 and the second nonferrous metal separator to separate and recover a plurality of nonferrous metals from the heavy material 15, not only the space for the equipment but the construction cost of the equipment can be reduced.

Although the embodiment of the present invention has been disclosed and described, this invention is not limited to it but may be practiced or embodied in still other ways such as modifications in design of the invention without departing from the essential character thereof.

For instance, the washing machine in the embodiment of this invention has such a design in that the fine dust and oily substance adhering on the scraps are removed by the upward blow of the water ejected from the water ejecting section and made overflow from the material charging section however, not limiting to this, it may be possible to adopt such a design as to spray water to the scraps by a shower device.

Further, water screens are used in the embodiment of this invention as a postwashing device for washing the light and heavy materials after separated by the heavy-liquid separator however, not limiting to this, other devices such as aforesaid shower-type washing machine may be used.

Moreover, the embodiment of this invention used a single nonferrous metal separator which works both as a first nonferrous metal separator for light material and a second nonferrous metal separator for heavy material however, not limiting to this, two nonferrous metal separators may be used separately.

Furthermore, the equipment for processing scraps may be provided with any device not limited to those disclosed and described in this embodiment if only said equipment is provided with a long-size material separator, a washing machine, a heavy-liquid separator, a first postwashing machine, a second postwashing machine, a first nonferrous metal separator, and a second nonferrous metal separator.

What is claimed is:

1. An equipment for processing scraps by separating and recovering various nonferrous metals from a mixture of scraps comprising nonferrous metals and nonmetals, the equipment comprising:

a long-size material separator for separating long-size material from the scraps which have been crushed and cleared of magnetic substance, a prewashing machine for washing out fine dust and oily substance adhering on the scraps which have been separated into a specified size, a heavy-liquid separator which is equipped with a separating vessel filled with a heavy liquid made up of water and magnetic powder body and separates the water-washed scraps into light and heavy materials by means of said heavy liquid, a first postwashing machine for washing out the heavy liquid adhering on aforesaid separated light material, a second postwashing machine for washing out the heavy liquid adhering on aforesaid separated heavy material, a first nonferrous metal separator for separating aforesaid light material cleared of heavy liquid into nonferrous metals and nonmetals based on the difference in the electric conductivity thereof applying a moving magnetic field to said light material, and a second nonferrous metal separator for separating aforesaid heavy material cleared of heavy liquid into plural kinds of nonferrous metals based on at least one Qf the difference in the specific gravity and the electric conductivity thereof by applying a moving magnetic field to said heavy material.

2. An equipment for processing scraps according to claim 1, wherein a single nonferrous metal separator which separates aforesaid light and heavy materials is used instead of aforesaid first and second nonferrous metal separators.

3. An equipment for processing scraps according to claim 1, wherein said equipment is provided with a circulation line to recover and reuse the magnetic powder body included in aforesaid heavy liquid.

4. An equipment for processing scraps according to claim 1, wherein aforesaid separating vessel is provided with a material charging section for charging aforesaid scraps and a material discharging section for discharging aforesaid light material at either one side thereof and a material discharging section for discharging aforesaid heavy material at the other side thereof, and aforesaid heavy liquid is ejected by a pump from at least one of the intermediate and the lower portion of said separating vessel to generate an upward flow of said heavy liquid at least in the upper half of said separating vessel, whereby the apparent specific gravity of said heavy liquid is increased and said light and heavy materials are separated.

5. A method of processing scraps by separating and recovering various nonferrous metals from a mixture of scraps comprising nonferrous metals and nonmetals, the method comprising:

a step of removing long-size material from aforesaid scraps which have been crushed and cleared of magnetic substance, a prewashing step of washing out with water the fine dust and oily substance adhering on the scraps from which the long-size material has been removed through aforesaid step, a heavy-liquid separating step of separating the scraps washed out through aforesaid step into light and heavy materials based on the difference in the specific gravity thereof by use of a heavy liquid made up of water and magnetic powder body and by giving an upward flow to said heavy liquid to increase its apparent specific gravity, a first postwashing step of washing out aforesaid heavy liquid adhering on aforesaid light material separated through aforesaid step, a nonferrous light metals separating step of separating aforesaid light material into nonferrous metals and nonmetals based on the difference in the electric conductivity thereof by applying a moving magnetic field to said light material from which the heavy liquid adhering thereon has been removed through aforesaid step;

a second postwashing step for washing out the heavy liquid adhering on aforesaid heavy material separated throuah aforesaid heavy-liquid separating step, and a nonferrous metals separating step of separating aforesaid heavy material which has been cleared of the adhering heavy liquid through aforesaid step into plural kinds of nonferrous metals based on at least one of the difference in the specific gravity and the electric conductivity thereof by applying a moving magnetic field to said heavy material.

* * * * *